(12) United States Patent
Schuman (10) Patent No.: US 8,686,913 B1
(45) Date of Patent: Apr. 1, 2014

(54) DIFFERENTIAL VECTOR SENSOR

(71) Applicant: SRC, Inc., Syracuse, NY (US)

(72) Inventor: Harvey Keith Schuman, Cazenovia, NY (US)

(73) Assignee: SRC, Inc., Syracuse, NY (US)

( * ) Notice: Subject to any disclaimer, the term of this patent is extended or adjusted under 35 U.S.C. 154(b) by 0 days.

(21) Appl. No.: 13/771,383

(22) Filed: Feb. 20, 2013

(51) Int. Cl.
*G01S 19/32* (2010.01)
*G01S 19/36* (2010.01)

(52) U.S. Cl.
USPC ............................ 343/797; 342/438; 342/439

(58) Field of Classification Search
USPC ................... 342/437–439, 432, 445; 343/795, 343/797–798, 807, 810, 812; 324/247, 326, 324/345
See application file for complete search history.

(56) References Cited

U.S. PATENT DOCUMENTS

| | | | |
|---|---|---|---|
| 2,270,130 A * | 1/1942 | Laport | ........................... 343/797 |
| 5,315,308 A | 5/1994 | Nehorai et al. | |
| 5,870,056 A | 2/1999 | Fowler | |
| 5,929,820 A | 7/1999 | Caulfield et al. | |
| 6,271,800 B1 | 8/2001 | Nakamura et al. | |
| 6,310,584 B1 | 10/2001 | Reece et al. | |
| 6,342,867 B1 | 1/2002 | Bell | |
| 6,529,172 B2 | 3/2003 | Zimmerman | |
| 6,819,300 B2 | 11/2004 | Gottl | |
| 6,885,350 B2 | 4/2005 | Godard et al. | |
| 6,922,059 B2 | 7/2005 | Zank et al. | |
| 6,924,776 B2 | 8/2005 | Le et al. | |
| 7,292,180 B2 | 11/2007 | Schober | |
| 7,616,168 B2 | 11/2009 | Tillery | |
| 7,619,579 B2 * | 11/2009 | Rahamim et al. | ............. 343/795 |
| 7,629,939 B2 | 12/2009 | Deng et al. | |
| 7,710,342 B2 | 5/2010 | Schadler et al. | |
| 7,920,099 B2 | 4/2011 | Chiu et al. | |
| 8,068,066 B2 | 11/2011 | Perkins, III | |
| 8,130,162 B2 | 3/2012 | Kildal | |

(Continued)

FOREIGN PATENT DOCUMENTS

JP  2009-124403  4/2009

OTHER PUBLICATIONS

A. Nehorai et al., Vector-sensor array processing for electromagnetic source localization, IEEE Transactions on Signal Processing, vol. 42(2), p. 376-398, Feb. 1994.*

(Continued)

*Primary Examiner* — Jack W Keith
*Assistant Examiner* — Fred H Mull
(74) *Attorney, Agent, or Firm* — George R. McGuire; Daniel P. Malley; Bond Schoeneck & King, PLLC (57) ABSTRACT

The present invention is directed to a system that includes a sensor having a plurality of antenna elements arranged in a three-dimensional array. None of the plurality of antenna elements is configured as a loop antenna element. Each of the plurality of antenna elements are configured to provide a sensor output signal in response to an incident electromagnetic field having predetermined characteristics. A processing circuit is coupled to the sensor, the processing circuit being configured to obtain a directional vector to a source of the incident electromagnetic field from the plurality of sensor output signals. The sensor output signals correspond to a plurality of field components of the incident electromagnetic field at a point. The plurality of field components include differential values such that the plurality of field components providing at least nine (9) degrees of freedom (DOFs).

25 Claims, 6 Drawing Sheets

(56) References Cited

U.S. PATENT DOCUMENTS 8,179,317 B2 5/2012 Seifer et al.
2010/0277385 A1 11/2010 Lewis et al.
2013/0106407 A1* 5/2013 Almog .................... 324/207.23

OTHER PUBLICATIONS

K. Nishizawa et al., Broadening Beamwidth of E-Plane Radiation Pattern of a Dipole Antenna With Loaded Monopole Elements, Antennas and Propagation Society International Symposium, vol. 4, p. 3984-3987, Jun. 2004.*
Degree of freedom. (2007). In the American Heritage Dictionary of the English Language. Retrieved from http://www.credoreference.com/entry/hmdictenglang/degree_of_freedom.*
Degrees of freedom. (2009). In the Penguin Dictionary of Physics. Retrieved from http://www.credoreference.com/entry/pendphys/degrees_of_freedom.*
S. Supakwong, The significance of vector sensor positioning on the array's ultimate detection capability, 2010 International Conference on Electrical Engineering/Electronics Computer Telecommunications and Information Technology, p. 1272-1276, May 2010.*
Antenna Types—Yagi, http://signalengineering.com/ultimate/yagi.html, Oct. 1, 2011.*
J. Tranquilla et al., Phase center considerations for the monopole antenna, IEEE Transactions on Antennas and Propagation, vol. 34(5), p. 741-744, May 1986.*
N. Murtaza et al., Multi-band Direction-sensitive Cognitive Radio Node, IEEE-APS Topical Conference on Antennas and Propagation in Wireless Communications (APWC), p. 251-254, Sep. 2011.*
Hasegawa et al. "A Phased Array Antenna Using Cross Dipole Antenna for Mobile Satellite Communications." 2010 International Conference on Electromagnetics in Advanced Applications (ICEAA). Sep. 24, 2010. pp. 465-468.

* cited by examiner

DIFFERENTIAL VECTOR SENSOR

BACKGROUND OF THE INVENTION

1. Field of the Invention

The present invention relates generally to geolocation systems, and particularly to a compact geolocation antenna system.

2. Technical Background

In general, the term geolocation refers to determining the geographic location of some object or thing. For the purpose of this invention, geolocation means determining the location of an object by sensing the radio frequency (RF) signals that the object or system is emitting. Examples of systems or objects that emit RF signals include cell phones, cell phone towers, Wi-Fi hot spots, radars, radio stations and the like. Once the emitted RF energy propagating over the air is detected, the direction (i.e., bearing) of the detected signal can be easily established. The geolocation system may include geographically diverse antennas that obtain the bearing of the RF emitter from various vantage points; and these bearings may be triangulated to find the exact geographical location of the RF emission. A single bearing, or "directional vector," can also be used in conjunction with other known information or intelligence to locate and identify the RF emitter. For example, the signal strength of a known type of RF emitter (e.g., a certain type of radar) can be used to estimate the range of the RF emitter. As another example, the geolocation system may be equipped with known mapping or intelligence data that can be used with the bearing information to geolocate the RF emitter. These non-limiting examples are not meant to be exhaustive, but rather are meant to give the reader a better understanding of the present invention.

The applications for geolocation range from the exotic to the mundane. In World War II, for example, the British government attempted to use geolocation techniques to detect the radio transmissions of German secret agents operating within the UK. Sixty years later similar techniques are being used in the UK to locate and prosecute "pirate" FM radio broadcasters. Nowadays, one common application for geolocation relates to public safety; emergency radio beacons are used by hikers, skiers, civil aircraft, etc., and are configured to transmit a unique RF signal that can be used by emergency personnel to find the location of the transmitter (and hence the hikers, skiers, aircraft, etc.) in the event of an emergency. In another example application, geolocation may be employed to ascertain the approximate location of a cell telephone handset (and thus the user) by determining which cell tower it is communicating with, determining its bearing to that tower, and estimating the range from the tower as a function of signal strength. Conversely, a user of broadband computing services could employ this technique to find the bearing and range of the nearest Wi-Fi hot spot. As alluded to above, geolocation may be used in a variety of military applications such as determining the location of enemy radars and radio transmissions.

One important component of a geolocation system is the antenna. An antenna with multiple output ports, each sensitive to a particular polarization of the E-Field or H-Field, is called a vector sensor. The conventional "optimal" vector sensor typically includes three dipole antennas and three loop antennas to sense the three Cartesian components of E-Field and of H-Field. It has been thought that such an antenna extracts the maximum available information of a field in a confined region of space. However, contrary to popular opinion, that is not generally the case, as is explained in the following discussion. A loop antenna senses the E-Field directly. The loop voltage is proportional to the differentials in that E-Field and is thus related, indirectly, to the H-Field penetrating the loop. Stated differently, an electrically small loop antenna with constant current is constrained to detect only that combination of differentials that corresponds to the net H-Field penetrating the loop. Thus, the H-Field must be sensed indirectly, i.e., derived from the E-Field differentials, because magnetic conductors do not exist in nature.

Figure 1:
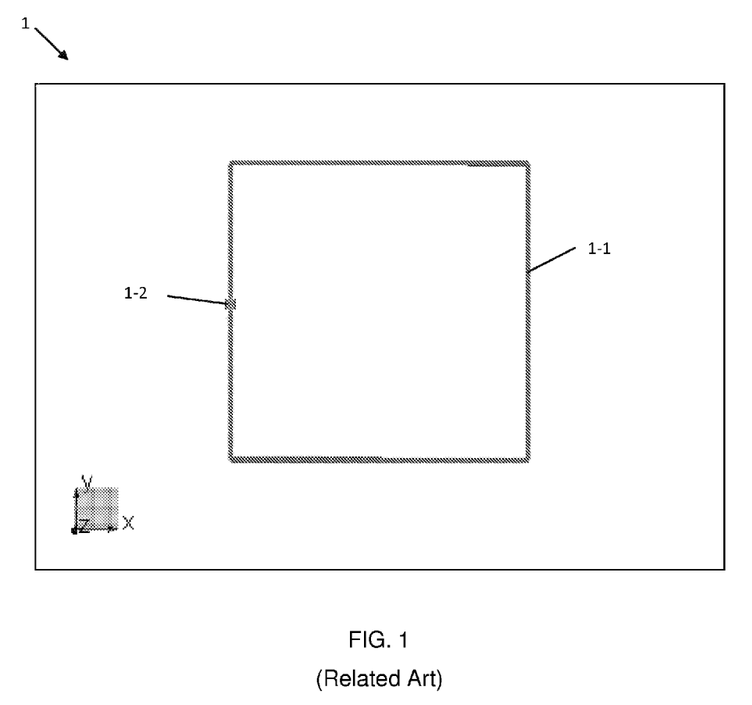
FIG. 1 is a plan view of a related art loop antenna.

In reference to the example diagram depicted in FIG. 1, a loop antenna 1 is disposed in the x, y plane and includes a small rectangular antenna loop 1-1 coupled to port 1-2. In this example a y-polarized plane wave is incident from the −x direction and a reflection wave is incident from the +x direction. If the direct and reflected E-Fields cancel at the origin, the net H-Field at the origin is a maximum, and the loop is sensitive to this H-Field. On the other hand, if an incident and reflected pair of x-polarized plane waves traveling along the y axis are introduced (and also phased to cancel the E-Field at the origin) it also will support a nonzero H-Field at the origin. If the two pairs of waves are phased with respect to each other so that the H-Fields cancel, the loop voltage will be zero. In that case, the loop will not sense either contribution of H-Field. This result is a consequence of the x-polarized components of induced loop current canceling the y-polarized components of induced loop current. In other words, as stated above, an electrically small loop antenna with constant current is constrained to detect only a particular combination of E-Field differentials that correspond to the net incident electromagnetic H-Field. Thus, one drawback associated with a loop antenna is its inability to sense individual components of the incident and reflected fields. Stated differently, because a single loop antenna can be employed to sense only the net H-field penetrating it, it provides only one degree of freedom (DOF) instead of the available two DOFs.

In one approach that was considered, an HF direction finding antenna design was implemented that included crossed loop antennas mounted on a monopole antenna to implement a three-orthogonal-loop-on-a-whip concept. Each loop consisted of an outer larger primary loop and an inner secondary loop. Since the design is based on two loop antennas and one monopole, it can only sense one component of E-Field and two components of H-Field at a point. Thus, the design is inherently limited to three degrees of freedom (DOFs). Moreover, the outer primary loop incorporates capacitive tuning and is an inherently narrow band solution.

In another loop antenna design that was considered, three isolated concentric windings are disposed around a non-conductive cube. Each winding is tuned to a slightly different frequency and attached to a nonaliasing filter and receiver. The purpose of this arrangement is, apparently, to attain a low loss broad operational bandwidth without retuning Nonetheless, this approach does not overcome the drawbacks associated with loop antenna sensors that were identified above, namely, the design is inherently limited to three DOFs.

In yet another conventional approach that was considered, a sensor is implemented that is comprised of three orthogonally oriented loop antenna elements. Each antenna element is designed to sense one Cartesian component of the H-Field. The "twin loop" refers to a "ground symmetrical loop" configuration that is employed to create the symmetry needed for it to function as a balun. As those of ordinary skill in the art appreciate, baluns are often used to suppress feedline currents and provide reasonably stable antenna patterns. This approach includes all of the drawbacks associated with the loop antenna designs described above and, in addition, the design features an impedance mismatch that results in an excessive noise figure (NF) for frequencies below 8 MHz.

In yet another approach that was considered, an antenna array was implemented that included six co-located antennas. The six antennas were comprised of three orthogonal loop antennas and three orthogonal dipoles. This sensor was designed to detect the three Cartesian components of E-Field and three Cartesian components of H-Field at a point. However, this antenna array did not perform especially well in experiments against even one single mode sky wave signal due to the effects of multipath.

What is needed, therefore, is a vector sensor (i.e., a direction finding antenna system) design that provides more than six DOFs to obviate the drawbacks described above while conforming to a form factor that has a relatively small footprint. A vector sensor is needed that has the ability to accurately resolve multiple angles-of-arrival (AoA) signals and capable of distinguishing coherent multipath that might otherwise be indiscernible by conventional vector sensors. Moreover, the vector sensor should only include high impedance ports, rather than the combination of both low and high impedance ports associated with the conventional sensors, to eliminate the impedance matching issues described above. Finally, a vector sensor is needed for broad band applications that may be difficult to achieve with loop antenna designs.

SUMMARY OF THE INVENTION

The present invention addresses the needs described above by providing a new type of sensor design, referred to as a "differential vector sensor" that provides twelve (12) DOFs to obviate the drawbacks described above while conforming to a form factor that has a relatively small footprint. The differential vector sensor of the present invention is configured to accurately resolve multiple angles-of-arrival (AoA) signals and is especially capable of distinguishing coherent multipath that might otherwise be indiscernible (by conventional vector sensors). Moreover, the differential vector sensor of the present invention only includes high impedance ports to thus simplify impedance matching. Finally, the differential vector sensor of the present invention is well-suited for broad band applications. For all of these reasons the differential vector sensor of the present invention represents a significant advance over conventional loop vector sensors or combined dipole-loop-based vector sensors.

One aspect of the present invention is directed to a system that includes a sensor having a plurality of antenna elements arranged in a three-dimensional array. None of the plurality of antenna elements is configured as a loop antenna element. Each of the plurality of antenna elements are configured to provide a sensor output signal in response to an incident electromagnetic field having predetermined characteristics. A processing circuit is coupled to the sensor, the processing circuit being configured to obtain a directional vector to a source of the incident electromagnetic field from the plurality of sensor output signals. The sensor output signals correspond to a plurality of field components of the incident electromagnetic field at a point, the plurality of field components including differential values, the plurality of field components providing at least nine (9) degrees of freedom (DOFs).

In another aspect, the present invention is directed to a system that includes an antenna sensor having a plurality of dipole antenna elements arranged in a three-dimensional array, the three-dimensional array of dipole antenna elements including six sensor array side portions. Each of the plurality of dipole antenna elements are configured to provide a sensor output signal in response to an incident electromagnetic field having predetermined characteristics. A processing circuit is coupled to the sensor, the processing circuit being configured to obtain a directional vector to a source of the incident electromagnetic field from the plurality of sensor output signals. The sensor output signals correspond to a plurality of field components of the incident electromagnetic field at a point. The plurality of field components include differential values, so that the plurality of field components providing at least nine (9) degrees of freedom (DOFs).

In another aspect the processing circuit is configured to use the plurality of summation signals and the plurality of difference signals to obtain all components of the incident electric field at the center of the sensor, including the differential values.

In another aspect of the invention, the sensor further includes a first antenna pair that has a first antenna subarray substantially disposed in a first plane formed by the x-axis and the z-axis and a second antenna subarray substantially parallel to the first antenna subarray. The first antenna subarray and the second antenna subarray are separated by a predetermined distance along the y-axis. The sensor also includes a second antenna pair that has a third antenna subarray substantially disposed in a second plane formed by the y-axis and the z-axis and a fourth antenna subarray disposed substantially parallel to the first antenna subarray. The third antenna subarray and the fourth antenna subarray are separated by a predetermined distance along the x-axis. The sensor further includes a third antenna pair that has a fifth antenna subarray substantially disposed in a third plane formed by the x-axis and the y-axis and a sixth antenna subarray substantially parallel to the fifth antenna subarray. The fifth antenna subarray and the sixth antenna subarray are separated by a predetermined distance along the z-axis.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention and together with the description serve to explain the principles and operation of the invention.

DETAILED DESCRIPTION

Figure 4:
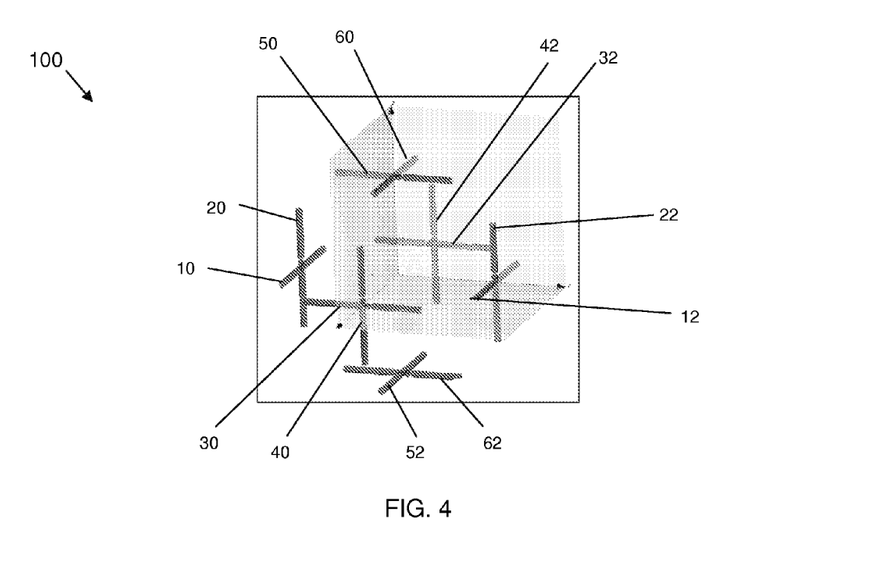
FIG. 4 is a isometric schematic diagram of the differential vector sensor in accordance with one embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the differential vector sensor of the present invention is shown in FIG. 4, and is designated generally throughout by reference numeral 100.

The present invention may be referred to as a differential vector sensor (DVS) because of its ability to detect and distinguish all derivative components of the E-Field at a point. This differs from conventional approaches that merely sense net differential E-Fields at a point using loop antennas. The DVS of the present invention thus provides a key innovation in that it provides more Degrees of Freedom (DOFs) than previously were thought possible with a localized sensor. Moreover, it is shown to be capable of distinguishing coherent multipath in cases where conventional vector sensors fail. The present invention has the ability to accurately resolve multiple angles-of-arrival (AoA) signals and is especially capable of distinguishing coherent multipath that might otherwise be indiscernible by the conventional vector sensor.

The differential vector sensor of the present invention was developed by adapting Maxwell's equations to the vector sensing problem. As explained in the Background of the Invention above, if the three components of E-Field and three components of H-Field are measured at a point, the measured result is limited to only six DOFs. The curl of E in terms of six partial derivatives is given in equation (1) by:

$$\nabla \times E = \hat{x}(\partial E_z/\partial y - \partial E_y/\partial z) + \hat{y}(\partial E_x/\partial z - \partial E_z/\partial x) + \hat{z}(\partial E_y/\partial x - \partial E_x/\partial y) \quad (1)$$

Moreover, Maxwell's equations in general and Faraday's law in particular, give the relationship between the curl of E and the derivative of the magnetic field with respect to time as:

$$\nabla \times E = -\frac{\partial B}{\partial t} \quad (2)$$

The present invention is configured to measure the three components of E-Field and measure six partial differences in the E-field components to estimate the six derivatives of the E-Field in equation (1). The previous state of the art best vector sensor measures the three components of E-Field and, via loop antennas, three components of H-Field by a restrictive combination of partial differences in E-Field that approximate equation (2). Stated differently, and explained in the discussion of FIG. 4 below, the present invention is configured to measure a total of twelve field characteristics. (The three additional field characteristics are related to second partial differences.) Depending on the processing capabilities, the differential vector sensor provides between nine (9) and twelve (12) DOFs, of which a linear combination results in the H-Field components.

Figure 2:
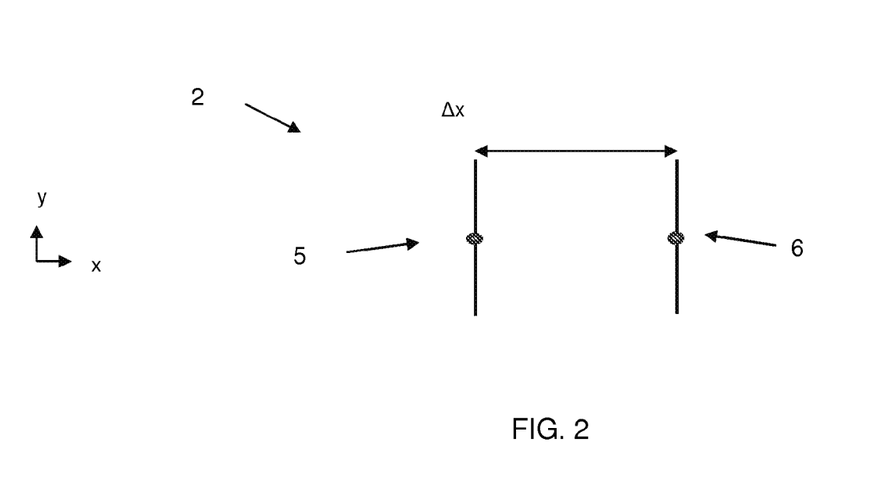
FIG. 2 is a diagrammatic depiction of two parallel dipole antennas shown for illustrative purposes.

Referring to FIG. 2, a diagrammatic depiction of two parallel dipole antennas (5, 6) are shown for illustrative purposes. Both dipole antenna 5 and dipole antenna 6 are aligned in parallel with the y-axis. Moreover, dipole antenna 5 is separated from dipole antenna 6 by some distance designated as $\Delta x$. The dipole antennas (5, 6) sense the E-Field directly such that the voltage obtained at dipole 5 represents the measured E-field at point x on the x-axis and the voltage obtained at dipole 6 represents the measured E-field at point $x+\Delta x$ on the x-axis. Thus, the sum of the voltages in the direction of the y-axis ($V_y$) provides at the center point $\Delta x/2$: $V_5 + V_6 = V_y$. In addition, the change in intensity of the electric field vector ($E_y$) over the distance $\Delta x$ can be derived from the voltage differences: $V_5 - V_6 = \Delta V_y / \Delta x$. The utility of this approach becomes more apparent when the performance of the conventional loop antenna shown in FIG. 1 is compared to the arrangement depicted in FIG. 3.

Figure 3:
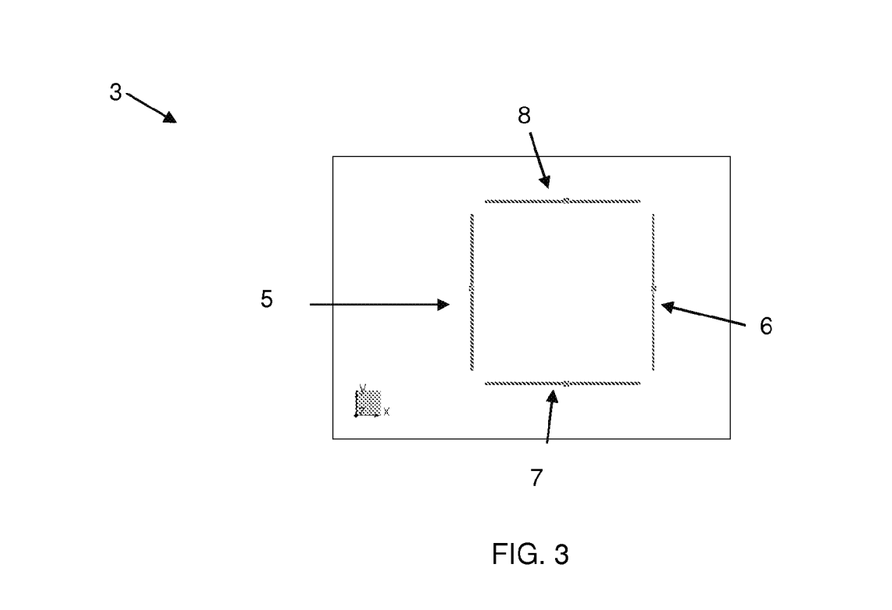
FIG. 3 is a diagrammatic depiction of two pairs of parallel dipole antennas shown for illustrative purposes.

Referring to FIG. 3, a diagrammatic depiction of two pairs of parallel dipole antennas is shown as an extension of FIG. 2 and is used to provide a comparison with the conventional loop antenna depicted in FIG. 1. Stated differently, the square loop shown in FIG. 1 is replaced by the arrangement shown in FIG. 3. Instead of having one feed port, each of the four dipole antennas in FIG. 3 includes its own individual port. Thus, the H-Field penetrating the square is approximated by the differences between voltages in opposing sides of the square. These difference signals estimate the differentials in the curl of the E-Field in Cartesian coordinates. But these differentials provide more information about the fields than is available from sensing only the H-Field component. These differentials are free to assume values representative of the incident field structure within the constraint that the linear combination of the differentials, as described by Maxwell's equations, result in the net H-Field penetrating the square. Thus, the H-Field, itself, is only a subset of the available information about the field.

Turning back to FIG. 3, the four dipole antennas (5, 6, 7 and 8) are oriented in a square and each is terminated by a 50Ω termination. Each dipole pair (5, 6) and (7, 8) is coupled to a difference combiner. The pairs of parallel dipoles are coupled to difference combiners to provide the partial differences used to estimate two differential components of the curl of E in equation (1). In this way, therefore, the pairs of parallel dipole antennas thus respond to H-Field. See equation (2). After replacing the loop in FIG. 1 with the arrangement depicted in FIG. 3, the system was calibrated such that the amplitude of the y polarized wave incident from the −x direction is set to induce a 0 dB signal in the combiner output for the y polarized dipoles. Four x, y plane polarized plane waves (incident and reflected) were transmitted along the axes and phased to null the net H-Field. Rather than recording a very low signal, each difference combiner recorded a signal that is 5 dB above that of the single wave case.

These results are in stark contrast to the results of the electrically small loop antenna of FIG. 1. The loop antenna generates a constant current that is constrained to detect only that combination of differentials that corresponds to the net H-Field penetrating the loop. When the H-Fields are of opposing phase at the origin, the loop voltage will be zero. In that case, the loop will sense neither the E-Field nor the H-Field. This result is a consequence of the x polarized components of induced loop current canceling the y polarized components of induced loop current. The dipole antenna configuration, on the other hand, yielded useful output that provided a greater understanding of both the E-Fields and H-Fields propagating at the sensor. Briefly stated, the differential vector sensor of the present invention (implemented with all dipoles) is superior to the conventional vector sensor (implemented with combinations of dipole and loop antennas) because it provides more data with a greater degree of granularity.

By extending this example to include all Cartesian coordinate components, the present invention uses the sum and differences of the sensed voltages to obtain each of the three E-field components ($E_x$, $E_y$, $E_z$) and each of the six differentials in the curl of the E-field. If desired, the H-field components can be computed from the E-Field differentials by Faraday's law at Eq. 2.

As embodied herein and depicted in FIG. 4, an isometric schematic diagram of the differential vector sensor 100 in accordance with one embodiment of the present invention is disclosed. Briefly stated, the differential vector sensor 100 is arranged in a cube. Sensor 100 includes a dipole antenna 10 aligned in parallel with the x-axis and crossed with (i.e., orthogonal to) a second dipole antenna 20 which is aligned with the z-axis. Dipole antenna 10 is arranged to sense E-Fields polarized in the x-direction and dipole antenna 20 is arranged to sense E-Fields polarized in the z-direction. Moreover, the crossed dipole pair (10, 20) is disposed in parallel with a second crossed dipole pair (12, 22) that is also disposed in an X-Z plane. In particular, the second dipole pair includes dipole antenna 12 (aligned in parallel with dipole 10) and dipole antenna 22 (aligned in parallel with dipole 20). Briefly then, dipole pair (10, 20) and dipole pair (12, 22) are both disposed in X-Z planes and separated by a distance Δy. Having described two parallel sides of the cubic structure, the remaining four sides of the cube can be described more briefly.

Dipole antenna pair (30, 40) and dipole antenna pair (32, 42) are both disposed in Y-Z planes and separated by a distance Δx. Similarly, dipole antenna pair (50, 60) and dipole antenna pair (52, 62) are both disposed in X-Y planes and separated by a distance Δz. Briefly then, the dipole pairs (30, 32, 40, 42) sense E-Fields that are polarized in the y-direction and in the z-direction, whereas the dipole pairs (50, 52, 60, 62) sense E-Fields that are polarized in the x-direction and in the y-direction. The granularity of data (sum and difference signal) achieved by the present invention is thus obtained by providing a crossed dipole antenna pair in each side of the sensor.

As before, the voltages sensed by opposing dipole antennas of like polarization are coupled to a sum combiner and a difference combiner. For example, the dipole antenna pair (10, 12) produces two voltage signals in the presence of an electromagnetic field. The voltages are processed to obtain a sum ($V_{10}+V_{12}=V_{x1}$) and a difference ($V_{10}-V_{12}=\Delta V_x/\Delta y$). By extension, six sum port signals and six difference port signals are generated.

Moreover, note that voltages $V_{52}$, $V_{10}$, and $V_{12}$ corresponding to dipole antenna 52, dipole antenna 10, and dipole antenna 12 can be combined as $V_{52}-(V_{10}+V_{12})/2$ to approximate $\partial E_x/\partial y$. Similarly $V_{10}$, $V_{12}$, and $V_{60}$, can be combined as $(V_{10}+V_{12})/2-V_{60}$ to also obtain $\partial E_x/\partial y$ but at a displaced point along the y axis. Properly combining these two, in turn, approximates $\partial^2 E_x/\partial y^2$. Specifically:

$$\partial^2 E_x/\partial y^2 \approx V_{52}-(V_{10}+V_{12})/2-((V_{10}+V_{12})/2-V_{60}). \quad (3)$$

As a result, there are a total of 12 field characteristics that can be sensed. Alternatively, the signals of the 12 dipole ports can be directly applied to estimating source direction without first going through sum and difference combiners because, again, these operations are linear.

The current invention is potentially superior to other sensors in estimating the direction of a source of electromagnetic radiation with a compact antenna structure because of the increased DOFs manifested by the E-Field derivatives and second derivatives. The signal from one source may arrive at the sensor from several directions due to reflection and scattering from objects within the propagation path as well as from ionospheric ray splitting. Consequently the field at the sensor is complicated by the constructive and destructive combining of the multipath signals. The additional DOFs would enable the sensor to decipher a greater class of propagation effects in developing calibration tables for estimating signal source direction. That the present invention increases the variety of multipath that can be sensed was illustrated by the example in paragraph [0005]. The multipath environment therein resulted in standing waves causing the horizontally polarized E-Field to be nulled at the center of the sensor and the vertically polarized H-Field to be nulled at the center of the sensor, as well. However the E-Field still exhibited substantial derivatives (slopes) at that point. The conventional vector sensor at best would include one dipole oriented parallel to the x axis, one dipole oriented parallel to the y axis, and one loop lying parallel to the x,y plane (only the loop was modeled in the example). The three antennas would be centered at the origin of the coordinate system. The signals from all of these antennas would be very weak because of the absence of E-Field and H-Field at that point. On the other hand, the four dipoles that would comprise part of the current invention would respond well to the x and y slopes of the E-Field. This ability to sense a greater class of multipath signals with a compact sensor better characterizes the propagation environment and, in turn, may prove superior in determining the direction of the source.

Figure 5:
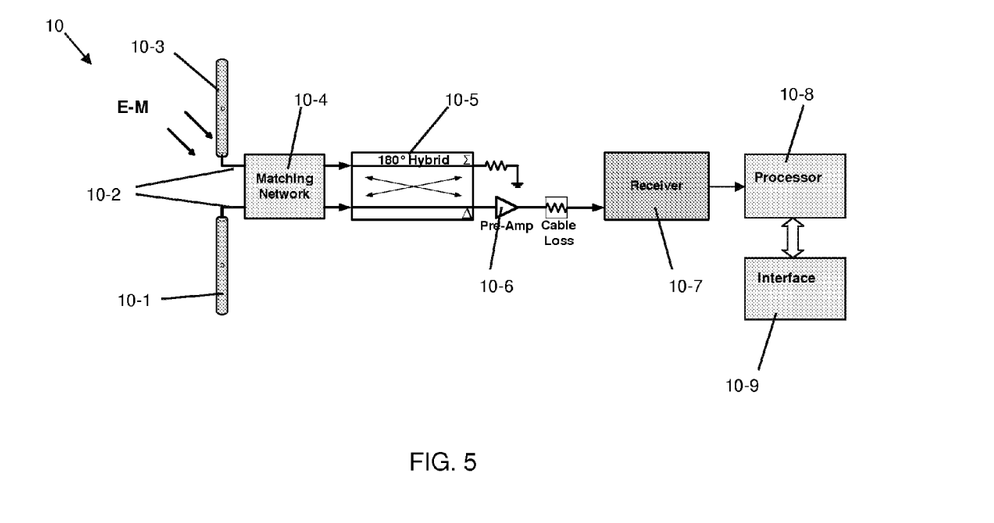
FIG. 5 is a block diagram of a dipole antenna employed in the differential vector sensor of the present invention.

As embodied herein and depicted in FIG. 5, a block diagram of a dipole antenna 10 employed in the differential vector sensor is disclosed in accordance with one embodiment of the present invention. This embodiment is designed to function in the HF band (~3-30 MHz). Dipole 10 includes two poles, or terminals 10-1 and 10-3 which are coupled to a matching network 10-4 by way of a differential port 10-2. Stated differently, the dipole antenna provides a balanced signal whereby the voltage signal provided by terminal 10-1 is 180° out of phase with respect to the voltage signal provided by terminal 10-3. The impedance matching network 10-4 is configured to maximize the transfer of signal power from the antenna to the receiver and substantially eliminate signal reflections. The impedance matching network is further coupled to an 180° hybrid directional coupler 10-5. Coupler 10-5 is configured to combine the differential signal provided by the antenna dipole and provide an unbalanced signal to the receiver 10-7 after it has been amplified somewhat by pre-amplifier 10-6. The receiver 10-7 is coupled, in turn, to processing circuit 10-8 that is configured to perform all of the calculations described herein. The processing circuit 10-8 is also coupled to one or more interface circuits 10-9.

The front end of the arrangement shown in FIG. 5 is configured to ensure that the desired signal is not obscured by the presence of noise. As a rule of thumb, the higher the ratio of signal power to noise power the better. And as those skilled in the art will understand, the receive signal quality depends on the ratio of signal power to external interference plus noise power. Typically in the HF band, the ratio is dominated by external interference rather than by the antenna/receiver noise. Nevertheless, the signal power must comfortably exceed noise power. To help ensure this, the pre-amp 10-6 is located relatively close to the output of each antenna element to compensate for both the loss in the cables as well as receiver noise.

In one embodiment of the present invention, the matching network 10-4 and the hybrid coupler 10-5 is implemented as a balun to minimize feedline radiating currents that could unduly disturb the radiation pattern shape. The term balun is shorthand for "balanced-unbalanced." In this embodiment, therefore, the balun converts the balanced differential signal into an unbalanced signal, minimizes feedline radiating currents and also functions as a matching network that maximizes the transfer of signal power from the antenna to the receiver as the signal propagates from the high reactance and low radiation resistance antenna elements to the 50Ω line that is coupled to the receiver.

The antenna/receiver noise figure then is approximated by $$F = \frac{1}{G(1-|\Gamma|^2)} \frac{P_{no}}{G_{amp}kTB}$$

where $\Gamma$ denotes the antenna reflection coefficient, $P_{no}$ the output noise power, kTB the input noise power, G the antenna directive gain, and $G_{amp}$ the preamplifier gain. In terms of the preamplifier noise figure, $F_{amp}$, this expression reduces to $$F = \frac{1}{G(1-|\Gamma|^2)} F_{amp}$$

Figure 9:
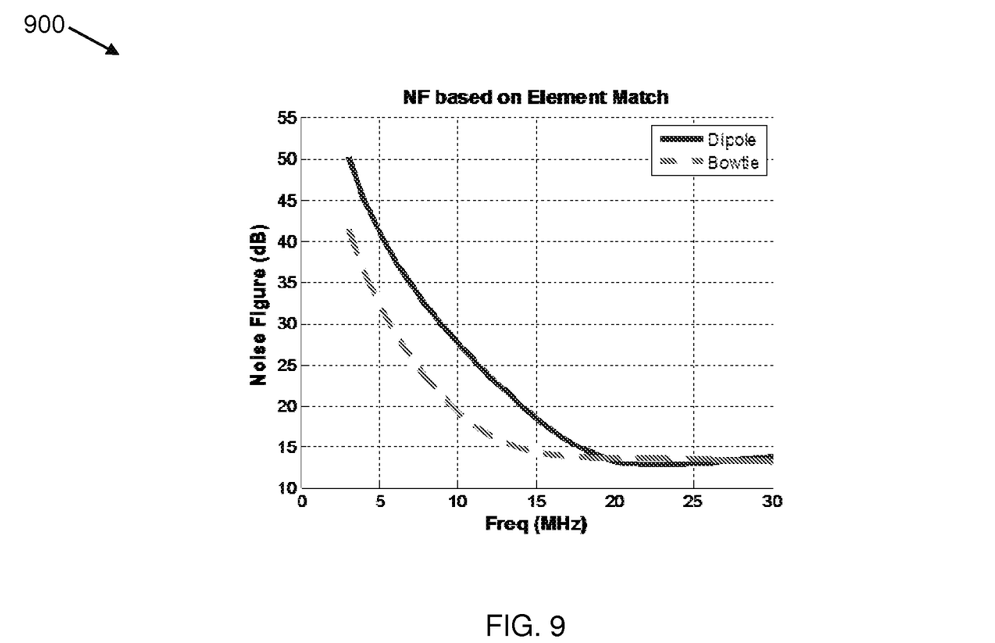
FIG. 9 is a plot illustrating the Noise Figure performance of the differential vector sensor depicted in FIG. 7.

The preamp noise figure is roughly comparable to the antenna directive gain such that the antenna/receiver noise figure is dominated by the input match of the antenna elements. Because the antenna elements are electrically small at lower frequencies within the HF band, large mismatches between the antenna elements and the 50Ω receive lines are expected. By optimizing the antenna design and by designing an appropriate matching network, the mismatch will be minimized, but it is still expected to dominate antenna/receiver noise figure. The computed Noise Figure for this embodiment of the present invention is shown in FIG. 9 described below.

In another embodiment of the present invention, conventional flux linkage transformers may be employed to implement the matching network. These devices typically introduce 1 or 2 dB of loss. Alternatively, the matching network could also be implemented using very low loss, 0.02-0.04 dB, transmission line transformers.

One advantage of an all-dipole sensor antenna relates to the consistent impedance loading; the short dipoles provide only high impedance ports, rather than a combination of high and low as in the conventional vector sensor. Another advantage is that dipoles typically are more easily amenable to broadbanding than are loop antennas. Bowtie shaped dipoles (FIG. 7), for example, exhibit broad band qualities. See, e.g., FIG. 9.

With respect to the "back-end" of the arrangement of FIG. 5, those skilled in the art will appreciate that the processing circuitry 10-8 may be implemented by a computer system that includes one or more processors coupled to an address, data and control bus that is configured to direct data and control information as appropriate. The computer system also includes various kinds of computer readable medium used for storing the information and instructions that are executed by the processor. The computer readable medium can also be used for storing temporary variables or other intermediate information during execution of programming instructions by the processor. Computer readable media may also be used to store static information and instructions for the processor. According to one embodiment of the invention, the processes of the present invention are performed by a computer system in response to a processor executing an arrangement of instructions. One or more processors in a multi-processing arrangement may also be employed to execute the instructions contained in system memory.

In alternative embodiments, hard-wired circuitry may be used in place of, or in combination with, software instructions to implement the embodiment of the present invention. Non-limiting examples of such circuits include application specific integrated circuits, gate array circuits, and the like. Thus, embodiments of the present invention are not limited to any specific combination of hardware circuitry and software.

The interface circuitry 10-9 shown in FIG. 5 may be implemented using any suitable device or combination of devices. For example, the processing circuitry 10-8 may be coupled to a graphical user interface to display information. The display may be implemented using any suitable device(s) including liquid crystal display, a cathode ray tube (CRT), active matrix display, plasma display, etc. The interface 10-9 may include audio components as well.

The interface circuitry 10-9 may include an input device for communicating information and command selections to the processor circuitry 10-8. The input device may include a keyboard that has alphanumeric and other keys, or a cursor control device, such as a mouse, a trackball, or cursor direction keys, for communicating direction information and command selections to the processor circuitry (and for controlling cursor movement on the display.

The interface circuitry 10-9 can include a communication interface that couples the sensor system 100 to a network such as a local area network (LAN) or a wide area network (WAN). Wireless links can also be employed with the present invention. In any such implementation, the communication interface 10-9 is configured to send and receive electrical, electromagnetic, or optical signals that carry digital data streams representing various types of information. The communication interface(s) may be implemented using one or more fiber optic modems, wireless interfaces, digital subscriber line (DSL) cards or modems, integrated services digital network (ISDN) cards, cable modems, telephone modems, or any other suitable communication interfaces configured to provide one or more data communication connections to corresponding types of communication lines. The interface 10-9 may also be employed to provide the processor circuitry 10-8 with data, including programming code, through the aforementioned network(s). With respect to the Internet, a server (not shown) might be employed to remotely monitor the system 10, or remotely program or revise the programming resident in the processor circuit 10-8.

Further, the interface circuitry 10-9 may be equipped with peripheral interface devices, such as a Universal Serial Bus (USB) interface, a PCMCIA (Personal Computer Memory Card International Association) interface, etc. Although a single interface 10-9 is depicted in FIG. 5, multiple communication interfaces can also be employed.

The term "computer-readable medium" as used herein refers to any medium that participates in providing data and/or instructions to the processor for execution. Such a medium may take many forms, including but not limited to non-volatile media, volatile media, and/or transmission media. Common forms of computer-readable media include, for example, various types of RAM, ROM (PROM, EPROM, EEPROM, etc.) FLASH-EPROM, any other memory chip or cartridge, a carrier wave, or any other medium from which a computer can read. Various types of optical and magnetic disks are known to be employed as computer-readable media. Thus, the present invention may employ a floppy or flexible disk, a hard disk, a magnetic tape, a CD-ROM, CDRW, DVD, USB device, punch cards, paper tape, optical mark sheets, and any other physical medium with patterns of holes or other optically recognizable indicia, or any other electrical, magnetic or optical medium.

Transmission media include coaxial cables, copper wire, or fiber optics. Transmission media can also take the form of acoustic, optical, or electromagnetic waves, such as those generated during radio frequency (RF) and infrared (IR) data communications.

As those skilled in the art will appreciate, the interface functions and some of the processing functions may be implemented in locations that are proximate to, or remote from, the sensor system 100 of the present invention.

Figure 6:
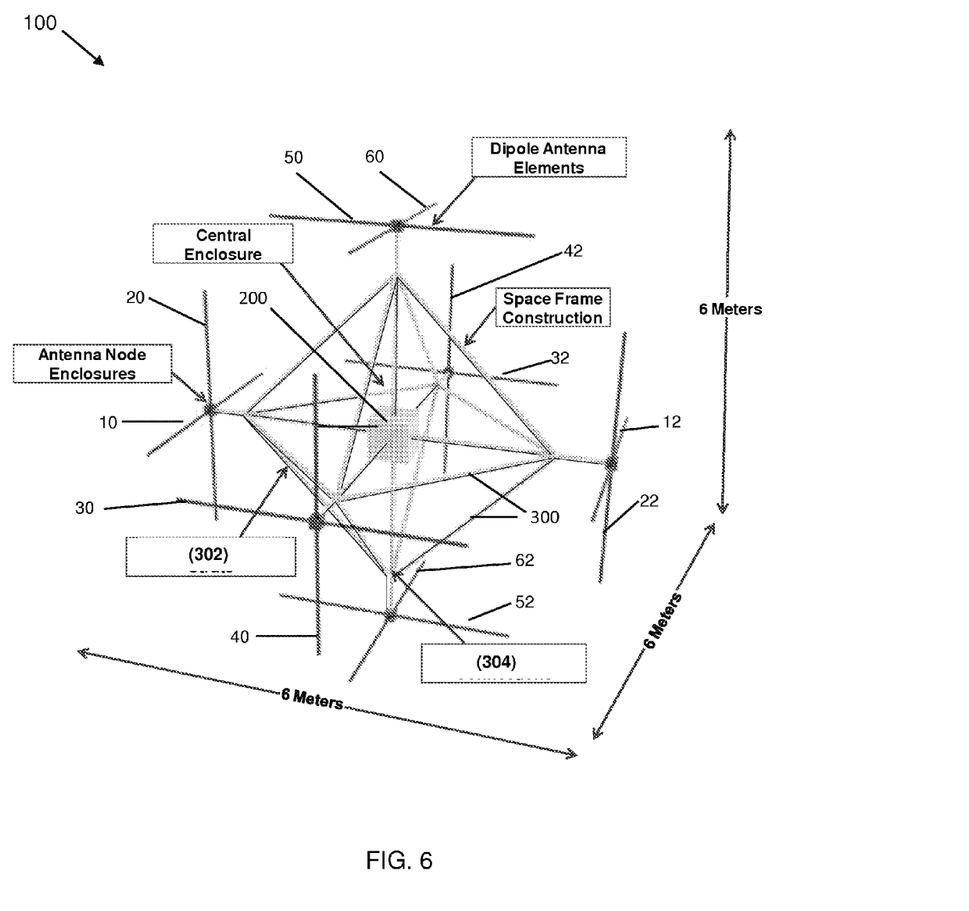
FIG. 6 is a perspective view of the differential vector sensor in accordance with the present invention.

As embodied herein and depicted in FIG. 6, a perspective view of the differential vector sensor 100 in accordance with the present invention is disclosed. This drawing provides a mechanical implementation of the schematic diagram provided by FIG. 4. Because like reference numerals refer to identical or functionally-similar elements, another description of the dipole antennas (10-60) is unnecessary and not included for brevity's sake. The sensor assembly 100 includes a diamond-shaped frame 300 that is comprised of non-conductive struts 302. The horizontal and vertical framing struts 302 are centrally connected by a non-conductive central enclosure 200. The space-frame 300 is completed by the addition of diagonal struts. The vertical, horizontal and diagonal forming struts 302 are joined by pinned strut connectors 304 to form the pointed portions of the "diamond." Each crossed dipole pair (e.g., 10, 20) is mechanically coupled to a point of the diamond by either a vertical or horizontal strut 302 to complete the cubic dipole antenna arrangement. In this embodiment, the cube is formed by 6 meter by 6 meter sides.

The struts may be implemented as 3" diameter PVC pipes. This diameter allows coaxial cabling to be routed between the dipole antenna pairs and the central enclosure 200. In one embodiment, the receiver electronics and/or power supplies may be disposed within the central enclosure 200. In this embodiment, the cabling from the receiver would be routed via lower vertical strut 302 to an external housing (not shown). Power supply cabling would also be routed into the interior of the enclosure 200 via this pathway.

Those skilled in the art will appreciate that several of the differential vector sensors 100 may be interconnected within a larger system. As noted in the Background section, the location of an RF emitter may be obtained by triangulating three or more bearings.

Figure 7:
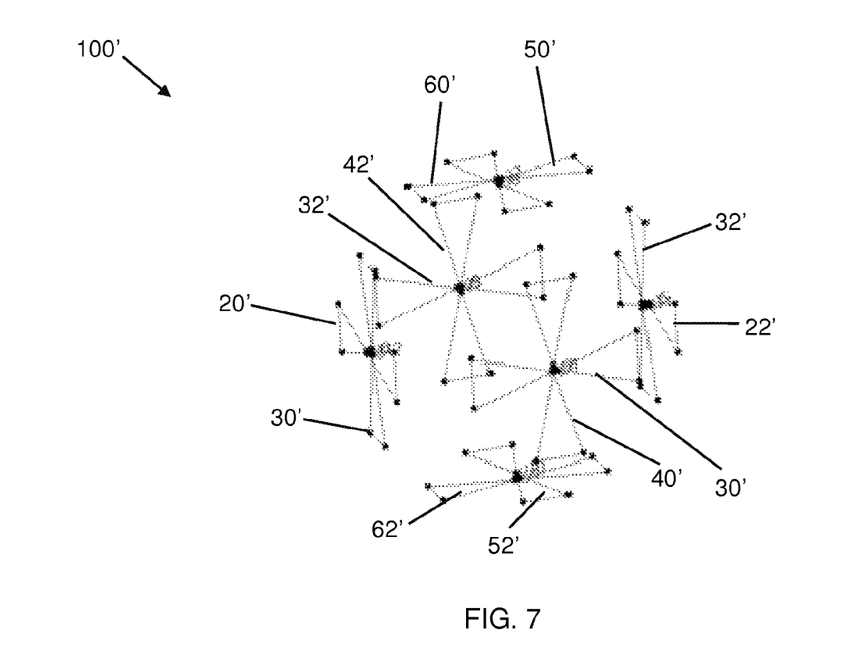
FIG. 7 is a isometric schematic diagram of the differential vector sensor in accordance with another embodiment of the present invention.

As embodied herein and depicted in FIG. 7, an isometric schematic diagram of the differential vector sensor in accordance with another embodiment of the present invention is disclosed. Again, for the sake of brevity, like reference numerals refer to identical or functionally-similar elements to avoid repetition. In this case, the crossed-dipole antennas employed in the previous embodiment are replaced by "bowtie-shaped" dipole antennas disposed within the cubic arrangement described above. One advantage of dipoles over loops is that dipole antennas are more amenable to broadbanding. Moreover, FIG. 12 provided below shows that bowtie shaped dipole antennas impart a better match and therefore a better noise figure over the band.

Figure 8:
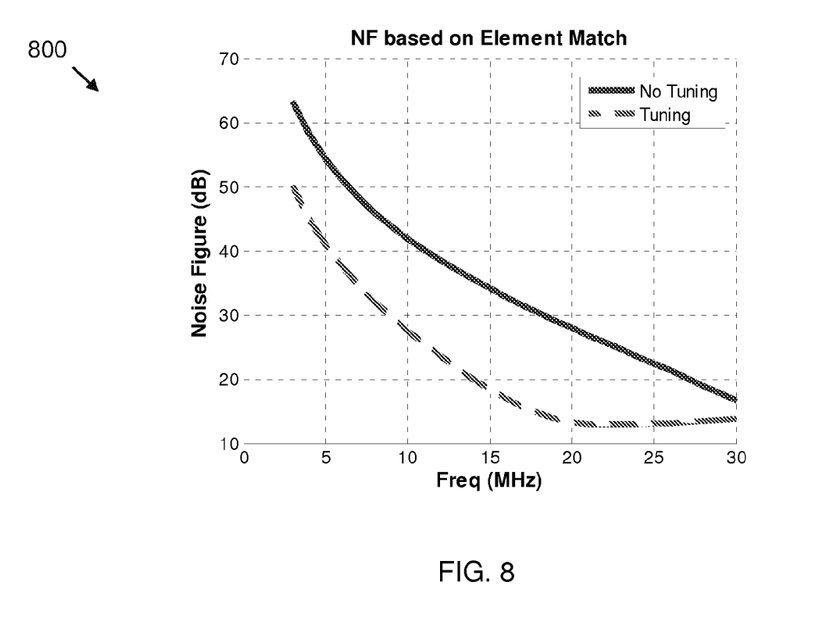
FIG. 8 is a plot illustrating the Noise Figure performance of the differential vector sensor with and without matching networks.

Referring to FIG. 8, a plot illustrating the Noise Figure performance of the differential vector sensor 100 (shown in FIGS. 4-6) is shown, with and without matching networks. This lower plot shows the improvement provided by the matching networks. In this case, the matching networks were modeled as simple inductors of 10 µH in combination with a step down transformer.

Referring to FIG. 9, a plot illustrating the Noise Figure performance of the differential vector sensor depicted in FIG. 7 is shown. The plot shows that bowtie shaped dipoles impart a better match and therefore a better noise figure over the HF band.

The differential vector sensor 100 of the present invention is fully polarimetric; it provides 12 degrees of freedom (DOFs) as opposed to the six DOFs of the conventional vector sensor. In other words, the present invention can provide and process twelve (12) independent electromagnetic field components that allow the system to describe an incident electromagnetic field with much greater specificity and granularity. These DOFs can be interpreted as corresponding to the Cartesian components of E-Field at a point, six first partial derivatives of that field at the point, and three second partial derivatives of that field at the point. (Specific combinations of these derivatives, as given by equation 2, yield the H-Field at the point.) Clearly, with appropriate parameter estimation processing, ambiguities should be resolvable for an incident wave including multipath. Clearly, the differential vector sensor 100 is capable of receiving signals from all azimuth and elevation angles simultaneously as a consequence of its left-right, and up-down symmetries. The sensor system will be capable of operating under a wide range of environmental conditions, and is suitably insensitive to common environmental variables.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A system comprising:
a differential vector sensor including a plurality of antenna elements arranged in a three-dimensional array, none of the plurality of antenna elements being configured as a loop antenna element, each of the plurality of antenna elements being configured to provide a sensor output signal in response to an incident electromagnetic field having predetermined characteristics; and
a processing circuit coupled to the sensor, the processing circuit being configured to obtain a directional vector to a source of the incident electromagnetic field from the plurality of sensor output signals, the sensor output signals corresponding to a plurality of field components of the incident electromagnetic field at a point, the plurality of field components including differential values, the plurality of field components providing at least nine (9) degrees of freedom (DOFs).

2. The system of claim 1, wherein the processing circuit is configured to obtain a plurality of summation signals and a plurality of difference signals from the sensor output signals, and wherein the sensor output signals, the plurality of summation signals and the plurality of difference signals correspond to a plurality of field components of the incident electromagnetic field.

3. The system of claim 2, wherein the plurality of summation signals and the plurality of difference signals are combined to obtain differential components of the electric field corresponding to the incident electromagnetic field.

4. The system of claim 3, wherein the processing circuit uses the differential components of the electric field to determine the magnetic field components of the incident electromagnetic field.

5. The system of claim 3, wherein the processing circuit uses the plurality of summation signals and the plurality of difference signals to obtain second differential components of the electric field.

6. The system of claim 1, wherein the sensor output signals includes twelve (12) sensor output signals.

7. The system of claim 1, wherein the plurality of field components provide twelve (12) DOFs.

8. The system of claim 1, wherein the plurality of antenna elements include a plurality of dipole antenna elements.

9. The system of claim 8, wherein the plurality of dipole antenna elements includes a plurality of crossed dipole antenna elements or a plurality of bow-tie dipole antenna elements.

10. The system of claim 1, wherein the three-dimensional array is configured as an array of antenna elements disposed in a volume characterized by a Cartesian coordinate system having three orthogonal axes including an x-axis, a y-axis and a z-axis, the array of antenna elements further comprising:
a first antenna pair including a first antenna subarray substantially disposed in a first plane formed by the x-axis and the z-axis and a second antenna subarray substantially parallel to the first antenna subarray, the first antenna subarray and the second antenna subarray being separated by a predetermined distance along the y-axis;
a second antenna pair including a third antenna subarray substantially disposed in a second plane formed by the y-axis and the z-axis and a fourth antenna subarray disposed substantially parallel to the third antenna subarray, the third antenna subarray and the fourth antenna subarray being separated by a predetermined distance along the x-axis; and
a third antenna pair including a fifth antenna subarray substantially disposed in a third plane formed by the x-axis and the y-axis and a sixth antenna subarray substantially parallel to the fifth antenna subarray, the fifth antenna subarray and the sixth antenna subarray being separated by a predetermined distance along the z-axis.

11. The system of claim 10, wherein the predetermined distance along the y-axis, the predetermined distance along the x-axis and the predetermined distance along the z-axis are substantially equal.

12. The system of claim 10, wherein the array of antenna elements is a cubic array of antenna elements including six sides, each of the six sides of the cubic array including an antenna subarray.

13. The system of claim 10, wherein the first antenna pair includes a first pair of crossed dipole antennas and the second antenna pair includes a second pair of crossed dipole antennas, and wherein the third antenna pair includes a third pair of crossed dipole antennas and the fourth antenna pair includes a fourth pair of crossed dipole antennas, and wherein the fifth antenna pair includes a fifth pair of crossed dipole antennas and the sixth antenna pair includes a sixth pair of crossed dipole antennas.

14. The system of claim 13, wherein the first antenna pair includes a first pair of bow-tie dipole antennas and the second antenna pair includes a second pair of bow-tie dipole antennas, and wherein the third antenna pair includes a third pair of bow-tie dipole antennas and the fourth antenna pair includes a fourth pair of bow-tie dipole antennas, and wherein the fifth antenna pair includes a fifth pair of bow-tie dipole antennas and the sixth antenna pair includes a sixth pair of bow-tie dipole antennas.

15. The system of claim 1, wherein the sensor output signals correspond to electric field components of the incident electromagnetic field.

16. A system comprising:
a differential vector sensor including a plurality of dipole antenna elements arranged in a three-dimensional array, the three-dimensional array of dipole antenna elements including six sensor array side portions, each of the plurality of dipole antenna elements being configured to provide a sensor output signal in response to an incident electromagnetic field having predetermined characteristics; and
a processing circuit coupled to the differential vector sensor, the processing circuit being configured to obtain a directional vector to a source of the incident electromagnetic field from the plurality of sensor output signals, the sensor output signals corresponding to a plurality of field components of the incident electromagnetic field at a point, the plurality of field components including differential values, the plurality of field components providing at least nine (9) degrees of freedom (DOFs).

17. The system of claim 16, the processing circuit being configured to obtain a plurality of summation signals and a plurality of difference signals from the sensor output signals, the sensor output signals, the plurality of summation signals and the plurality of difference signals corresponding to a plurality of field components of the incident electromagnetic field, the processing circuit being configured to use the plurality of summation signals and the plurality of difference signals to obtain the differential values of the electric field corresponding to the incident electromagnetic field.

18. The system of claim 16, wherein the sensor output signals includes twelve (12) sensor output signals.

19. The system of claim 16, wherein the plurality of field components provide twelve (12) DOFs.

20. The system of claim 16, wherein the sensor output signals correspond to electric field components, the electric field components and first and second partial differential components of the electric field providing twelve (12) DOFs.

21. The system of claim 16, wherein the plurality of dipole antenna elements are selected from a group of dipole antenna elements that includes crossed dipole antenna elements or bow-tie dipole antenna elements.

22. A system comprising:
a differential vector sensor including a plurality of dipole antenna elements arranged in a three-dimensional array, each of the plurality of dipole antenna elements being configured to provide a sensor output signal in response to an incident electromagnetic field having predetermined characteristics, the three dimensional array being disposed in a volume characterized by a Cartesian coordinate system having three orthogonal axes including an x-axis, a y-axis and a z-axis, the sensor further comprising,
a first antenna pair including a first antenna subarray substantially disposed in a first plane formed by the x-axis and the z-axis and a second antenna subarray substantially parallel to the first antenna subarray, the first antenna subarray and the second antenna subarray being separated by a predetermined distance along the y-axis,
a second antenna pair including a third antenna subarray substantially disposed in a second plane formed by the y-axis and the z-axis and a fourth antenna subarray disposed substantially parallel to the first antenna subarray, the third antenna subarray and the fourth antenna subarray being separated by a predetermined distance along the x-axis, and
a third antenna pair including a fifth antenna subarray substantially disposed in a third plane formed by the x-axis and the y-axis and a sixth antenna subarray substantially parallel to the fifth antenna subarray, the fifth antenna subarray and the sixth antenna subarray being separated by a predetermined distance along the z-axis; and
a processing circuit coupled to the sensor, the processing circuit being configured to obtain a plurality of summation signals and a plurality of difference signals from the sensor output signals, the sensor output signals, the plurality of summation signals and the plurality of difference signals corresponding to a plurality of field components of the incident electromagnetic field, the processing circuit being configured to use the plurality of summation signals and the plurality of difference signals to obtain differential components of the electric field corresponding to the incident electromagnetic field.

23. The system of claim 22, wherein the plurality of antenna elements include a plurality of dipole antenna elements, the plurality of dipole antenna elements being selected from a group of dipole antenna elements that includes crossed dipole antenna elements and bow-tie dipole antenna elements.

24. The system of claim 22, wherein the sensor output signals includes twelve (12) sensor output signals.

25. The system of claim 22, wherein the plurality of field components provide twelve (12) DOFs.

* * * * *